US012502567B2

(12) United States Patent
Hung et al.

(10) Patent No.: US 12,502,567 B2
(45) Date of Patent: Dec. 23, 2025

(54) DOUBLE RETAINING RING AND ENERGY-ABSORBING DEVICE HAVING THE SAME

(71) Applicant: YOKE INDUSTRIAL CORP., Taichung (TW)

(72) Inventors: Wei-Chieh Hung, Taichung (TW); Chia-Hsien Wang, Taichung (TW)

(73) Assignee: YOKE INDUSTRIAL CORP., Taichung (TW)

( * ) Notice: Subject to any disclaimer, the term of this patent is extended or adjusted under 35 U.S.C. 154(b) by 71 days.

(21) Appl. No.: 18/740,519

(22) Filed: Jun. 12, 2024

(65) Prior Publication Data

US 2025/0381427 A1 Dec. 18, 2025

(51) Int. Cl.
*A62B 35/04* (2006.01)
*A62B 35/00* (2006.01)

(52) U.S. Cl.
CPC .......... *A62B 35/04* (2013.01); *A62B 35/0037* (2013.01)

(58) Field of Classification Search
CPC ............................ A62B 35/04; A62B 35/0037
See application file for complete search history.

(56) References Cited

U.S. PATENT DOCUMENTS

| | | | | |
|---|---|---|---|---|
| 10,143,866 B2* | 12/2018 | Yang | A62B 35/0025 |
| 11,524,189 B2* | 12/2022 | Hasse | F16B 45/045 |
| 11,752,371 B2* | 9/2023 | Hung | F16B 21/12 403/316 |
| 2019/0069644 A1* | 3/2019 | Hetrich | A62B 35/0037 |
| 2020/0129790 A1* | 4/2020 | Stephenson | A62B 35/0025 |

* cited by examiner

*Primary Examiner* — Anita M King
(74) *Attorney, Agent, or Firm* — Apex Juris, pllc; Cera Oh

(57) ABSTRACT

A double retaining ring is provided. Either a first retaining ring or a second retaining ring is connected to a shaft seat and the other of the first retaining ring and the second retaining ring is connected to two receiving seats. The shaft seat has an axial hole. Each receiving seat has two fixing arms. An accommodating groove having an opening is formed between the fixing arms. The shaft passes through the axial hole and is inserted into the two accommodating grooves. Two rivet holes are provided on two sides of the shaft. Two rivets respectively pass through the rivet holes and the shaft is fixed to the fixing arms through the two rivets. The two rivets are breakable and the shaft is detachable from the accommodating grooves.

10 Claims, 9 Drawing Sheets

DOUBLE RETAINING RING AND ENERGY-ABSORBING DEVICE HAVING THE SAME

BACKGROUND OF THE INVENTION

Technical Field

The present invention relates generally to a safety retaining ring, and more particularly to a double retaining ring which could be engaged with an energy-absorbing package and an energy-absorbing device having the same.

Description of Related Art

Generally, a back ring at a full-body safety harness is engaged with a ring body, wherein the ring body could be fastened to a self-retracting lifeline, and a hook, which is connected to a steel rope of the self-retracting lifeline, is fastened to a fixture of a building or a fixture of a scaffolding.

In order to enhance a buffer effect when a worker wearing the full-body safety harness falls from a height, an energy-absorbing package could be connected to between a body of the self-retracting lifeline and the ring body or between the steel rope of the self-retracting lifeline and the hook. Although the above mentioned ring body, which is engaged with the full-body safety harness, could be provided for the self-retracting lifeline to fasten, the ring body could only be used as a buckle for the self-retracting lifeline and could not enhance the buffer effect due to the lack of capability of buffering.

BRIEF SUMMARY OF THE INVENTION

In view of the above, the primary objective of the present invention is to provide a double retaining ring, wherein a connection structure between the double retaining ring has a breakable weakness, so that the ring body could absorb an impact force and could be disposed with an energy-absorbing package and a self-retracting lifeline, thereby enhancing the buffer effect of the double retaining ring.

In order to achieve the above objective, the present invention provides a double retaining ring, including a first retaining ring, a second retaining ring, and a pivot device. The pivot device includes a shaft seat, two receiving seats, and a shaft, wherein the shaft seat is connected to either the first retaining ring or the second retaining ring and the two receiving seats are connected to the other of the first retaining ring and the second retaining ring; the shaft seat has an axial hole; each of the two receiving seats has two fixing arms, and an accommodating groove and an opening are formed between the two fixing arms; the opening is formed on one side of the accommodating groove; two rivet holes are respectively provided on two opposite sides of the shaft; the shaft passes through the axial hole and is inserted into the two accommodating grooves of the two receiving seats; two rivets respectively pass through the two rivet holes, wherein two ends of each of the two rivets are engaged with the two fixing arms of each of the two receiving seats.

In order to achieve the above objective, the present invention provides an energy-absorbing device with a double retaining ring, including a double retaining ring and an energy-absorbing package. The double retaining ring includes a first retaining ring, a second retaining ring, and a pivot device, wherein the pivot device includes a shaft seat, two receiving seats, and a shaft; the shaft seat is connected to either the first retaining ring or the second retaining ring and the two receiving seats are connected to the other of the first retaining ring and the second retaining ring; the shaft seat has an axial hole; each of the two receiving seats has two fixing arms, and an accommodating groove and an opening are formed between the two fixing arms; the opening is formed on one side of the accommodating groove; two rivet holes are respectively provided on two opposite side of the shaft; the shaft passes through the axial hole and is inserted into the two accommodating grooves of the two receiving seats; two rivets respectively pass through the two rivet holes, wherein two ends of each of the two rivets are engaged with the two fixing arms of each of the two receiving seats. The energy-absorbing package includes a strap body and a folded portion formed by folding a middle of the strap body, wherein two loops are respectively provided on two ends of the strap body; one of the two loops fits around the first retaining ring and the other of the two loops fits around the second retaining ring.

When the present invention is used, the first retaining ring of the double retaining ring is engaged with a back of a full-body safety harness or a back ring of the full-body safety harness, the first retaining ring and the second retaining ring are respectively engaged with the two ends of the energy-absorbing package; the second retaining ring is fastened to the self-retracting lifeline, and a hook of a steel rope of the self-retracting lifeline is fastened to a fixture of a building or a fixture of a scaffolding.

With the aforementioned design, when a user wearing the full-body safety harness falls from a height, the user would exert a force on the second retaining ring. An impact force exerted on the second retaining ring breaks the two rivets which are engaged with the fixing arms; after the two rivets absorb the impact force and are broken, the shaft is detached from the openings of the two receiving seats, so that the second retaining ring and the first retaining ring are separated and the energy-absorbing package absorbs the impact force. In this way, the double retaining ring of the present invention has the buffer capacity and could be engaged with the energy-absorbing package and the self-retracting lifeline, thereby enhancing the buffer effect.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
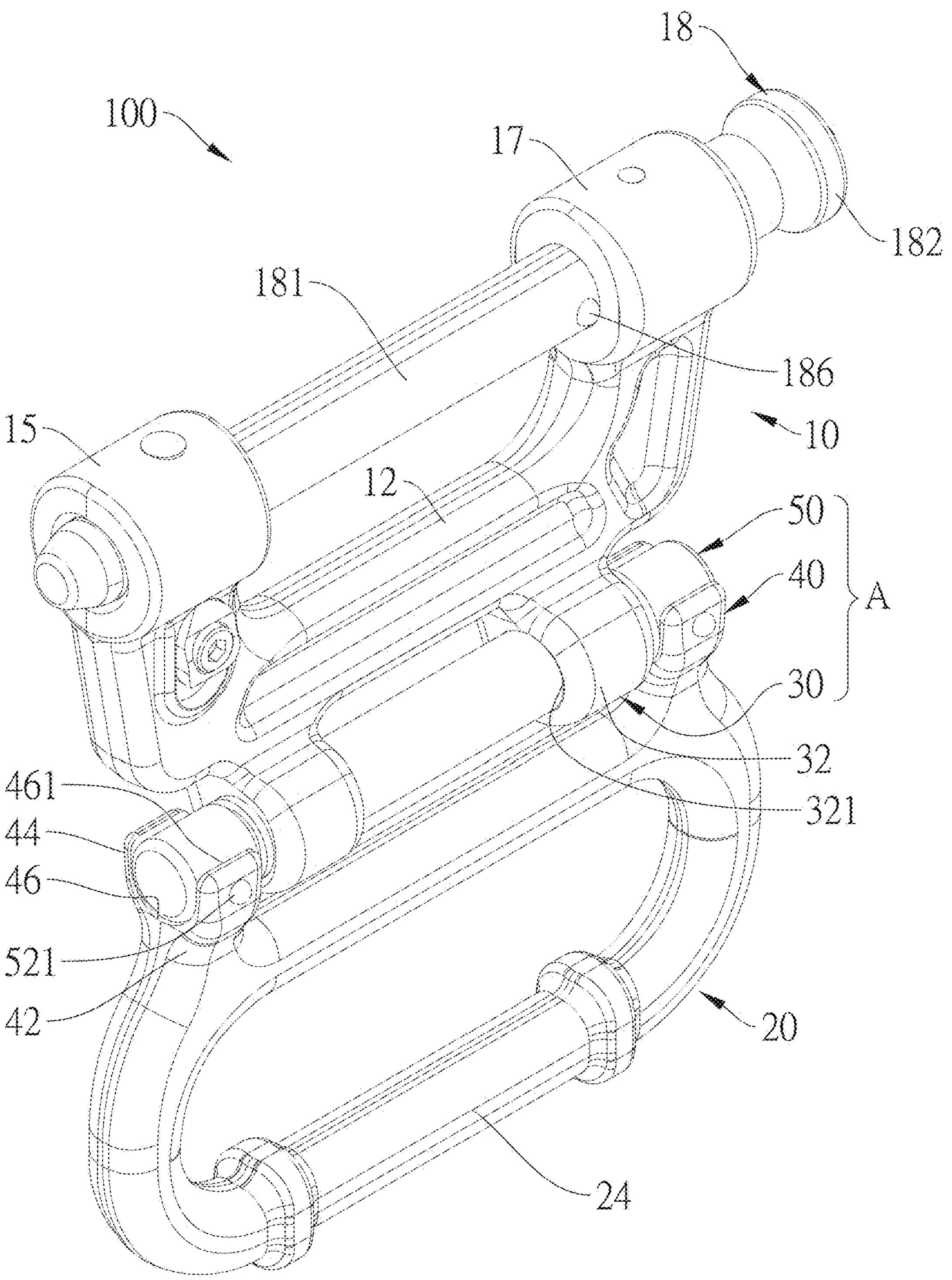
FIG. 1 is a perspective view of the double retaining ring according to an embodiment of the present invention.

A double retaining ring 100 according to an embodiment of the present invention is illustrated in FIG. 1 to FIG. 5 and includes a first retaining ring 10, a second retaining ring 20, and a pivot device A for connecting between the first retaining ring 10 and the second retaining ring 20, wherein the first retaining ring 10 and the second retaining ring 20 are spaced along a top-bottom direction.

The first retaining ring 10 is a detachable D-ring. One side of the first retaining ring 10, which is close to the second retaining ring, has a first connecting rod 12. The first connecting rod 12 is a straight rod and two ends of the first connecting rod 12 are respectively connected to a first side rod 14 and a second side rod 16. The first side rod 14 and the second side rod 16 are rod bodies positioned opposite to each other in a left-right direction and the two ends of the first connecting rod 12 extends in a direction away from the second retaining ring 20. A free end of the first side rod 14 is connected to a first bolt seat 15, wherein the first bolt seat 15 has a first perforation 151. A free end of the second side rod 16 is connected to a second bolt seat 17, wherein the second bolt seat 17 has a second perforation 171. The second perforation 171 is opposite to the first perforation 151 in the left-right direction.

A pin slot 152 is provided in the first side rod 14 and the first bolt seat 15, wherein an extending direction of the pin slot 152 is the same as an extending direction of the first side rod 14. A top end of the pin slot 152 communicates with the first perforation 151. A top side of the first bolt seat 15 has a plug hole 153. The plug hole 153 and the pin slot 152 face each other in the top-bottom direction. A plug 154 fits in the plug hole 153. A surface of the first side rod 14 has an elongated hole 141, wherein an extending direction of the elongated hole 141 is the same as the extending direction of the first side rod 14, and the elongated hole 141 communicates with a periphery the pin slot 152. A side of the second bolt seat 17 has a screw hole 172; more specifically, a top side of the second bolt seat 17 has the screw hole 172. A restricting member 173 is screwed into the screw hole 172, and the restricting member 173 is a threaded rod and one end of the restricting member 173 reaches into the second perforation 171.

A dowel pin 142 and a spring 145 are disposed in the pin slot 152. The dowel pin 142 is a straight rod and a periphery of the dowel pin 142 has a notch 143. One end of the dowel pin 142 has an inclined surface 144, wherein the inclined surface 144 reaches into the first perforation 151. The spring 145 abuts against the other end of the dowel pin 142 and an inner end of the pin slot 152. A push button 146 is disposed on the first side rod 14 and has a convex portion 147. The convex portion 147 passes through the elongated hole 141 and a free end of the convex portion 147 fits in the notch 143 of the dowel pin 142. A screw passes through the push button 146 to fasten the convex portion 147 to the dowel pin 142 through screwing.

The first retaining ring 10 further includes a bolt 18. The bolt 18 is inserted into the first perforation 151 of the first bolt seat 15 and the second perforation 171 of the second bolt seat 17. The bolt 18 is detachably engaged with the first bolt seat 15 and the second bolt seat 17. More specifically, the bolt 18 has a bolt body 181 and a head 182; the head 182 is connected to one end of the bolt body 181 and abuts against one surface of the second bolt seat 17 away from the first bolt seat 15. An axis of the bolt body 181 is substantially perpendicular to the extending direction of the first side rod 14 and the extending direction of the elongated hole 141. The bolt body 181 passes through the first perforation 151 and the second perforation 171. The other end of the bolt body 181 forms a bevel 183; when the bolt body 181 passes through the first perforation 151, the bevel 183 pushes the inclined surface 144 of the dowel pin 142 bottomward.

A portion of the bolt body 181 passing through the first perforation 151 has a fixing slot 184. An elongated slot 185 is provided on a peripheral surface of the bolt body 181 and is a straight slot extending along the axis of the bolt body 181. The end of the dowel pin 142 having the inclined surface 144 is inserted into the fixing slot 184 and restricts a movement of the bolt 18. In this way, the bolt 18 is detachably fixed to the first bolt seat 15 and the second bolt seat 17. The end of the restricting member 173 reaching into the elongated slot 185 restricts a movable range of the bolt 18 along the axis of the bolt body 181. A block 186 is elastically engaged with the periphery of the bolt body 181 of the bolt 18. The head 182 has a button 187. When the button 187 is pressed, the block 186 is driven to shrink into the bolt body 181 and abuts against one surface of the second bolt seat 17 facing the first bolt seat 15.

The second retaining ring 20 is a closed ring. One side of the second retaining ring 20, which is close to the first retaining ring 10, has a second connecting rod 22, and the second connecting rod 22 is a straight rod. The other side of the second retaining ring 20, which is away from the first retaining ring 10, has a hanging rod 24. The hanging rod 24 is a straight rod, and two ends of the hanging rod 24 have two bulges 241, wherein a contour of a periphery of each of the two bulges 241 is greater than a contour of a periphery of the hanging rod 24. Two curved rod 26 are connected between the second connecting rod 22 and the hanging rod 24. The two curved rod 26, the second connecting rod 22, and the hanging rod 24 are connected to form the second retaining ring 20.

Figure 2:
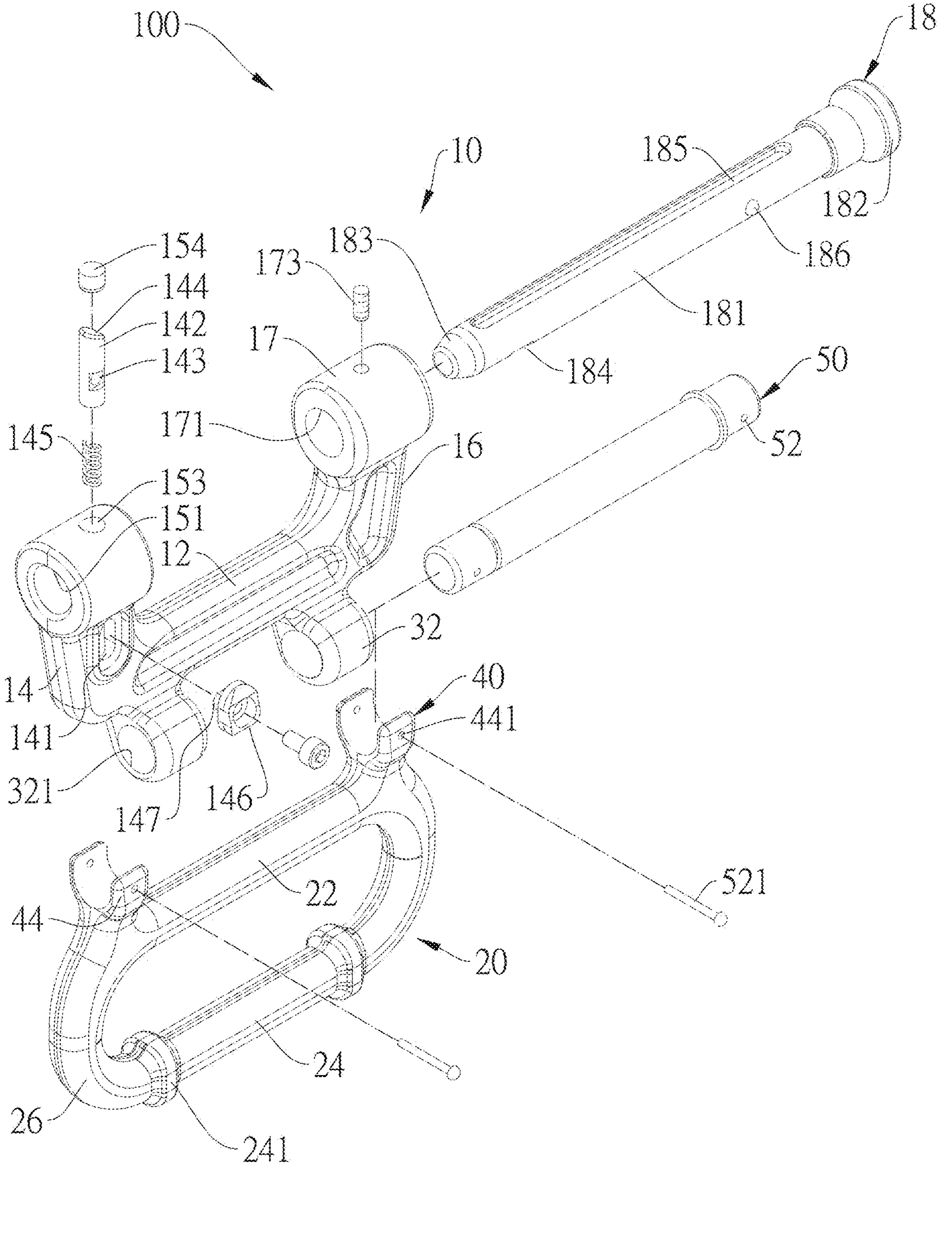
FIG. 2 is an exploded view of the double retaining ring according to the embodiment of the present invention.
Figure 3:
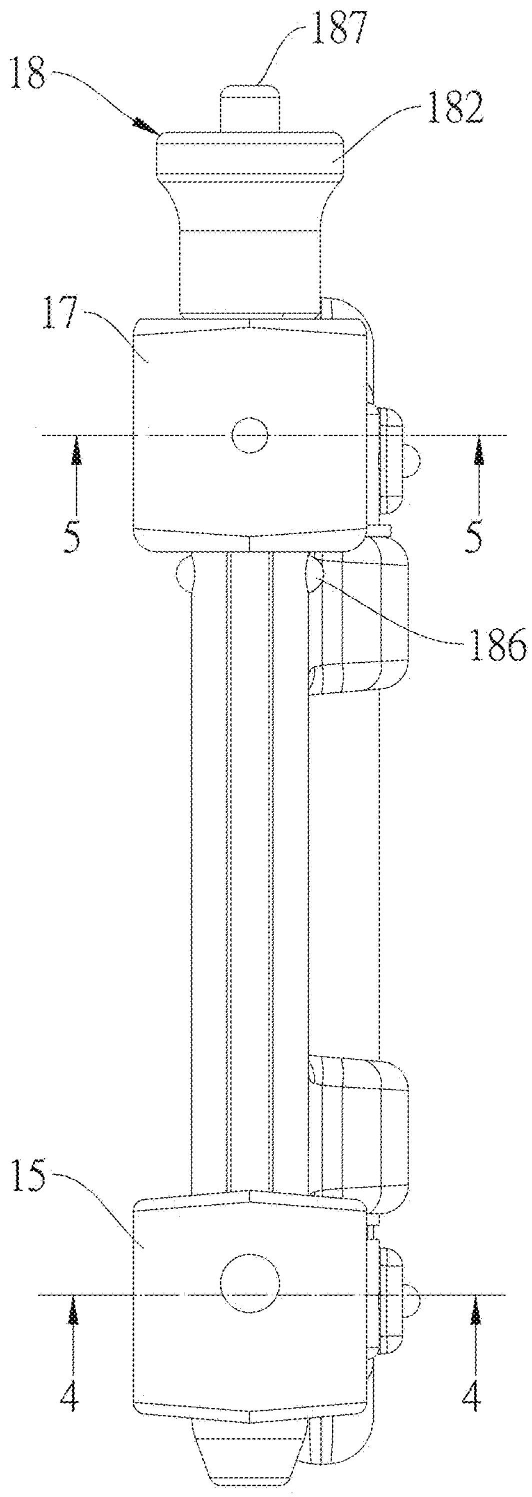
FIG. 3 is a top view of the double retaining ring shown in FIG. 1.
Figure 4:
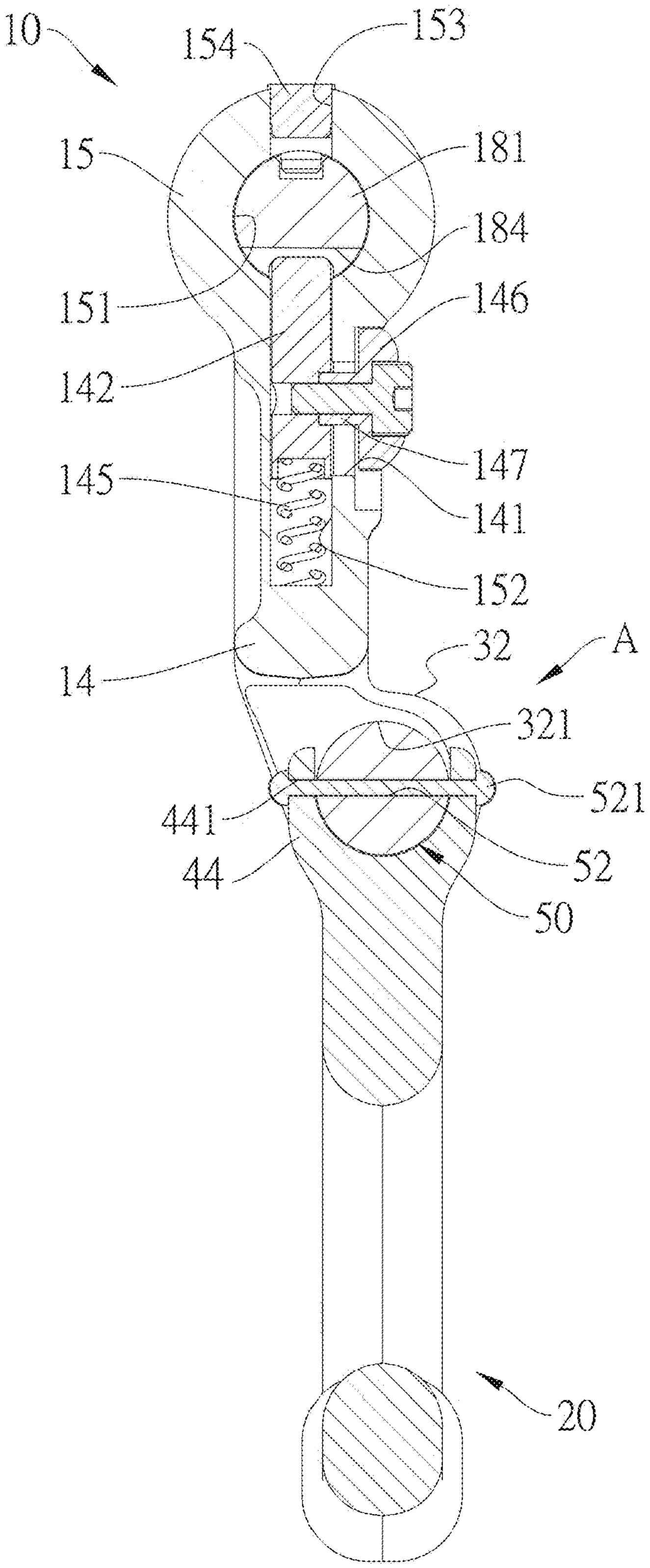
FIG. 4 is a sectional view along the 4-4 line in FIG. 3.
Figure 5:
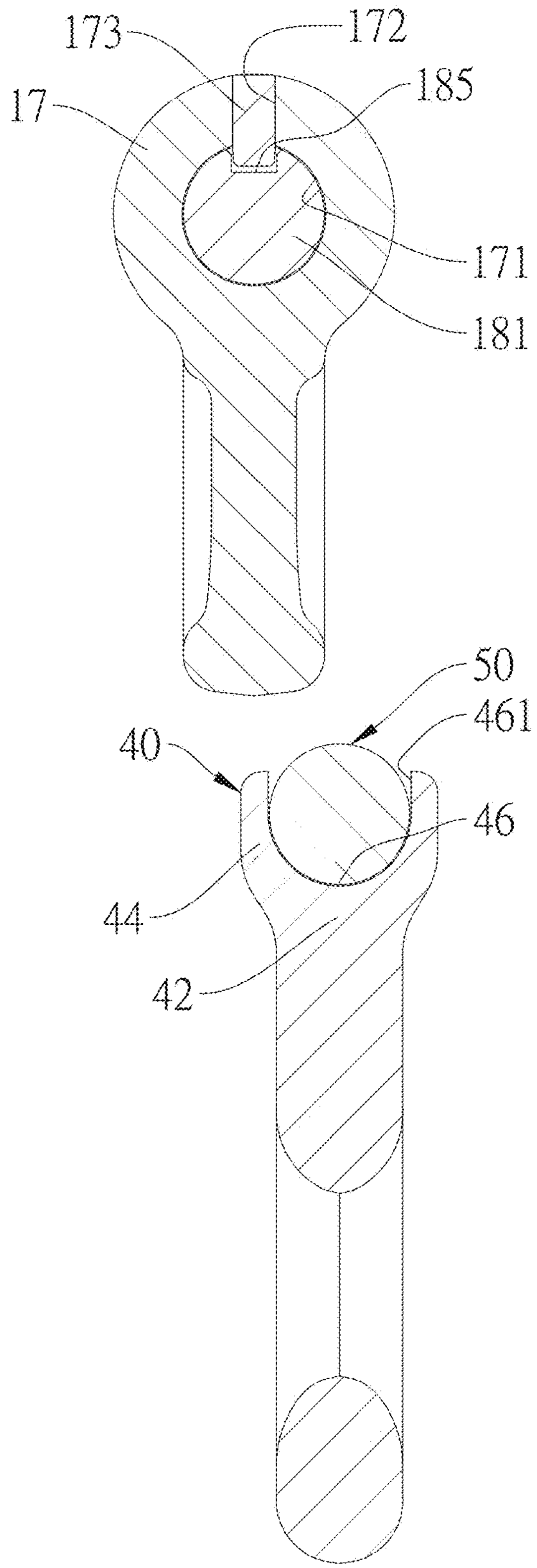
FIG. 5 is a sectional view along the 5-5 line in FIG. 3.
Figure 6:
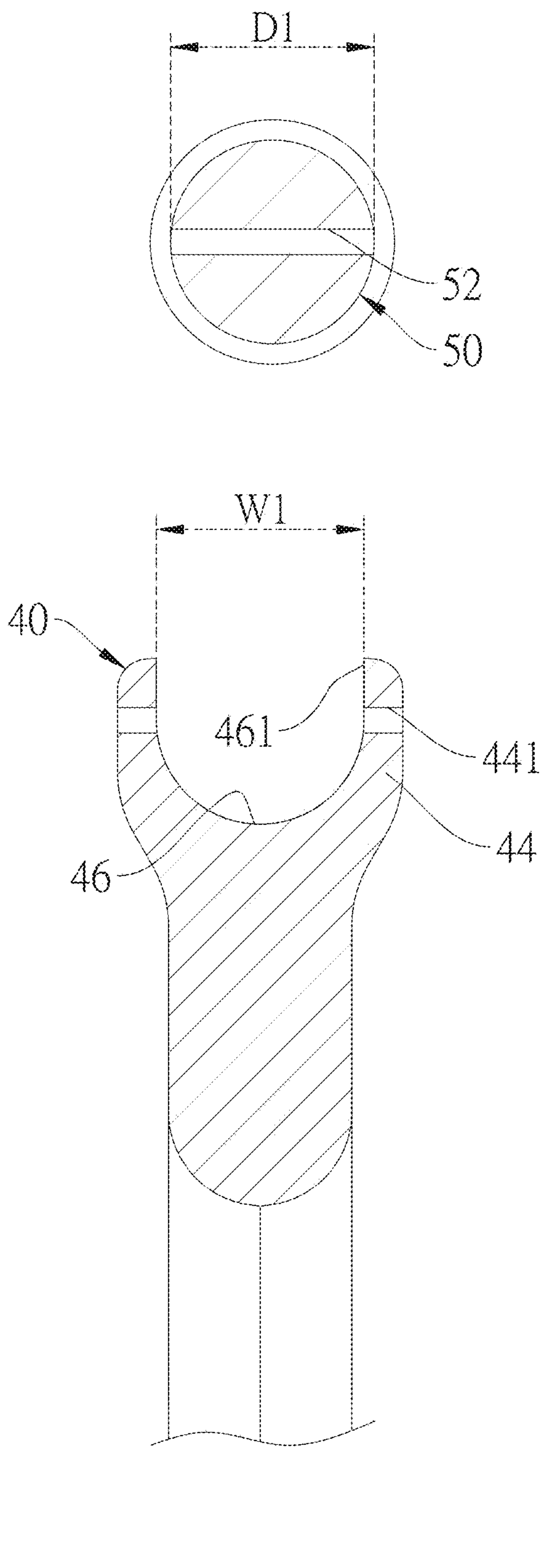
FIG. 6 is a schematic view of the double retaining ring shown in FIG. 5, showing the shaft and the receiving seat are separated.

The pivot device A includes a shaft seat 30, two receiving seats 40, and a shaft 50. As shown in FIG. 2, FIG. 4, and FIG. 6, the shaft seat 30 includes two ring bodies 32, wherein the two ring bodies 32 are disposed at an interval and are connected to the two ends of the first connecting rod 12, respectively. An axial hole 321 is formed on the two ring bodies 32, wherein an axis of the axial hole 321 is substantially parallel to the axis of the bolt body 181.

The two receiving seats 40 are disposed at an interval and are connected to two ends of the second connecting rod 22. The ring bodies 32 are located between the receiving seats 40. Each of the receiving seats 40 has a base portion 42, wherein the base portion 42 is connected to the second connecting rod 22 of the second retaining ring 20. The base portion 42 of each of the receiving seats 40 is connected to two fixing arms 44. Each of the fixing arms 44 extends in a direction from the base portion 42 to the first retaining ring 10. Each of the fixing arms 44 has an inserted hole 441, wherein the two inserted holes 441 of each of the two fixing arms 44 face each other in a front-rear direction. An accommodating groove 46 and an opening 461 are formed between the fixing arms 44, wherein the opening 461 is formed on one side of the accommodating groove 46. In the current embodiment, the opening 461 is formed on a top side of the accommodating groove 46. An inner wall of the accommodating groove 46 is a C-shaped curved surface. A width W1 of the opening 461, i.e. a length of the shortest distance between two free ends of the fixing arms 44, is greater than or equal to a diameter D1 of the shaft 50.

The shaft 50 is a round rod and two opposite sides of the shaft 50 respectively have a rivet hole 52. The shaft 50 passes through the axial hole 321 of the shaft seat 30 and is inserted into the two accommodating grooves 46 of the receiving seats 40. Two rivets 521 are respectively inserted into the two rivet holes 321, wherein two ends of each of the two rivets 521 are engaged with the two fixing arms 44 that are corresponding. More specifically, the two ends of each of the two rivets 521 are riveted to the two inserted holes 441 of the corresponding fixing arms 44. A strength of which each of the two rivets 521 is engaged with the corresponding fixing arms 44 is less than a strength of the shaft 50 or a strength of which the shaft 50 is engaged with the shaft seat 30. That is, in the structure in which the first retaining ring 10 is rotatably engaged with the second retaining ring 20 through the pivot device A, the two rivets 521 are pre-set to be a weakness for absorbing an impact force upon being broken. When a position of the first retaining ring 10 is fixed and the second retaining ring 20 is subjected to the impact force, the two rivets 521 are broken to separate the first retaining ring 10 and the second retaining ring 20.

When the double retaining ring 100 of the above mentioned embodiment is used, the double retaining ring 100 is engaged with a back ring of a full-body safety harness. Referring to FIG. 1 to FIG. 4, a user pushes the push button 146 to drive the dowel pin 142 to move bottomward and detach from the fixing slot 184, thereby releasing the bolt 18. At the same time, the user presses the button 187 of the head 182, so that the block 186 is shrunk into the bolt body 181; at that time, the user could pull out the bolt 18 from the first bolt seat 15 and open the first retaining ring 10. Then, the user passes the bolt 18 of the first retaining ring 10 through the back ring of the full-body safety harness and reinserts the bolt body 181 of the bolt 18 into the first bolt seat 15; during the process, the dowel pin 142 is reinserted into the fixing slot 184 of the bolt body 181 and the block 186 abuts against the surface of the second bolt seat 17 facing the first bolt seat 15, so that the bolt 18 is fixed between the first bolt seat 15 and the second bolt seat 17. In this way, the operation of setting the double retaining ring 100 on the full-body safety harness is completed.

Figure 7:
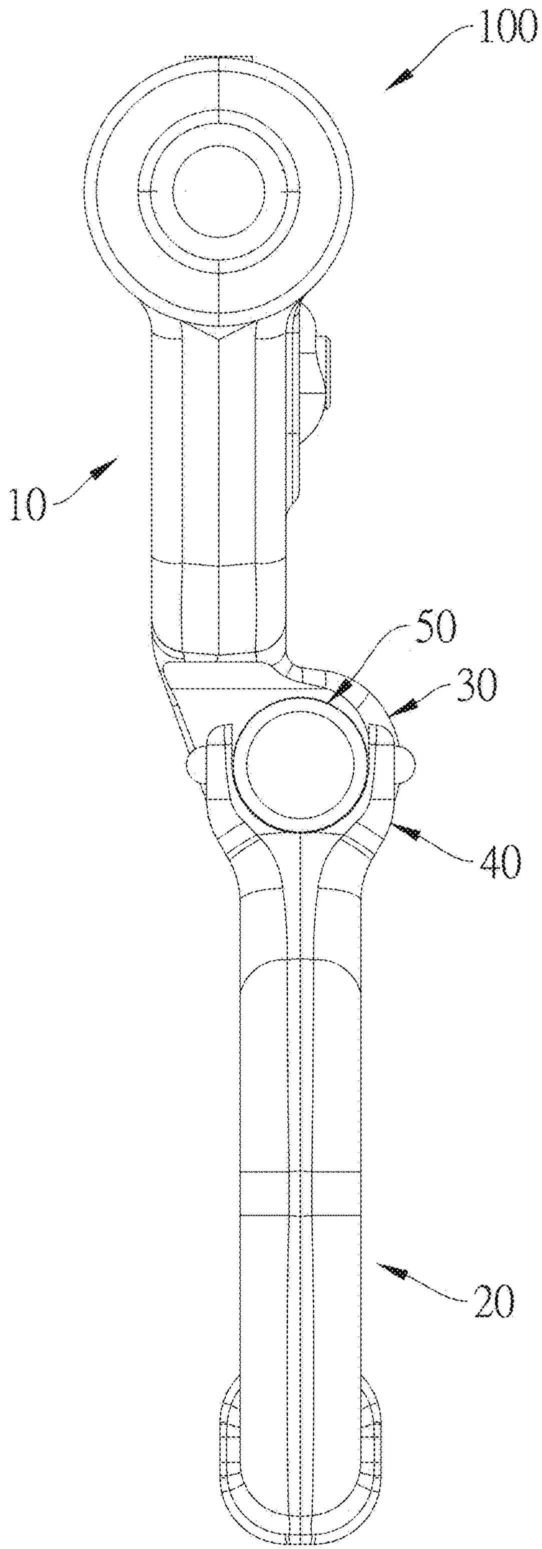
FIG. 7 is a side view of the double retaining ring shown in FIG. 1.
Figure 8:
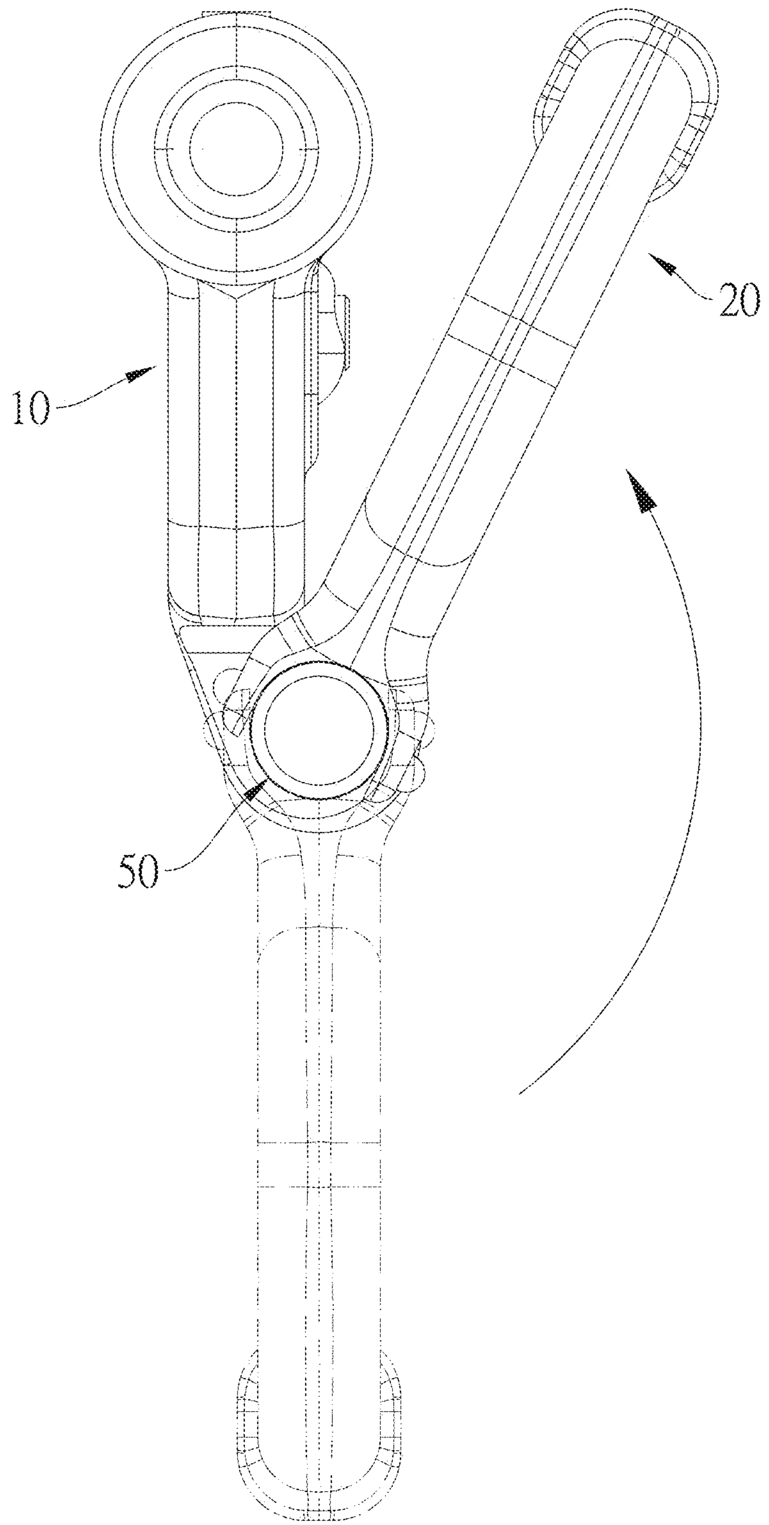
FIG. 8 is a schematic view of the double retaining ring in FIG. 7, showing the second retaining ring is rotated relative to the first retaining ring.
Figure 9:
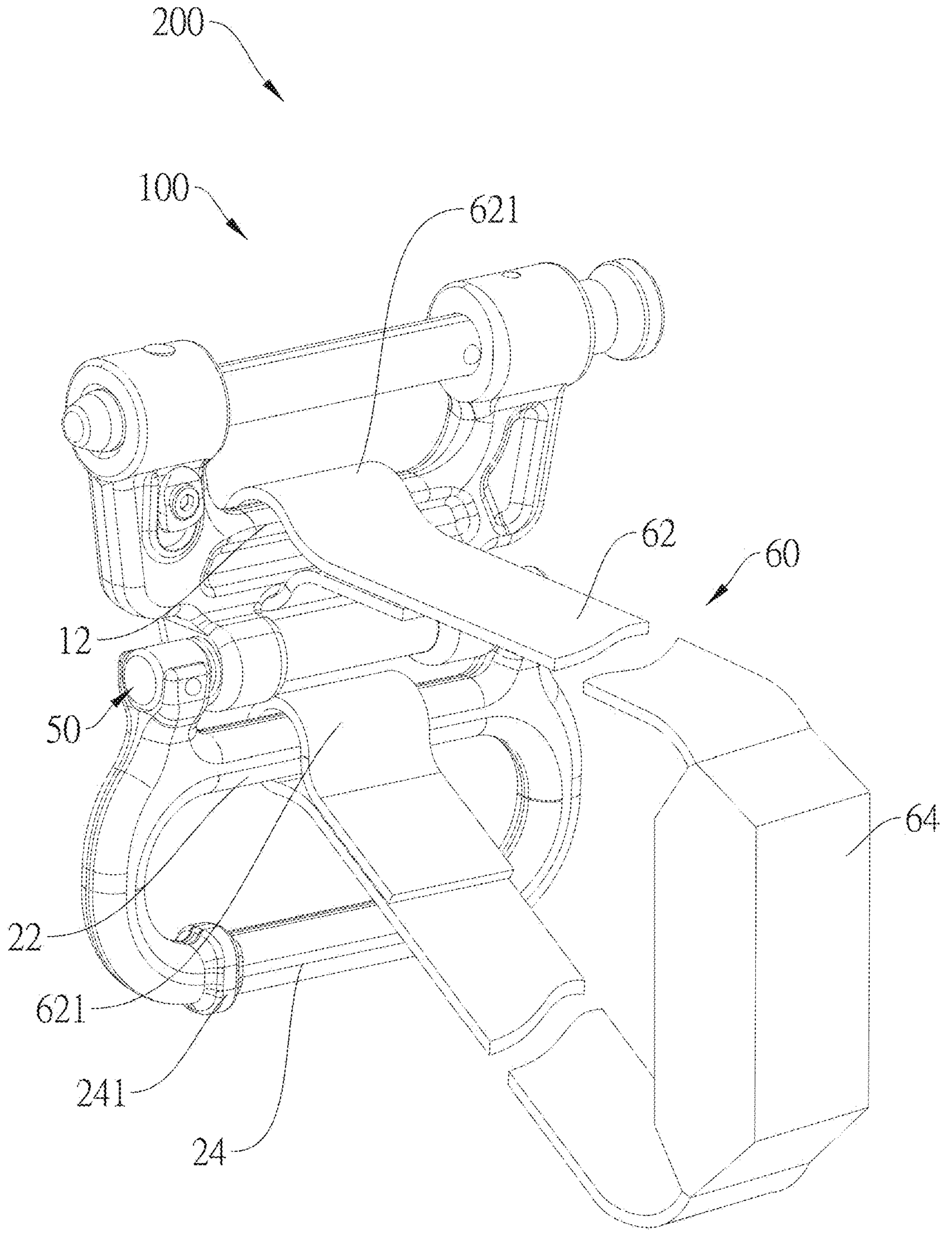
FIG. 9 is a perspective view of the double retaining ring, showing the double retaining ring is engaged with the energy-absorbing package.

Referring to FIG. 7 and FIG. 8, when the double retaining ring 100 of the above mentioned embodiment is engaged with the back ring of the full-body safety harness, the second retaining ring 20 could rotate relative to the first retaining ring 10 with the shaft 50 as a rotation center. Referring to FIG. 9, when the double retaining ring 100 is used, the hanging rod 24 of the second retaining ring 20 could be provided for a self-retracting lifeline to fasten. The first retaining ring 10 and the second retaining ring 20 are configurated to engage with an energy-absorbing package 60. The energy-absorbing package 60 includes a strap body 62 and a folded portion 64 formed by folding a middle of the strap body 62. Two loops 621 are respectively provided on two ends of the strap body 62, wherein one of the two loops 621 fits around the first connecting rod 12 of the first retaining ring 10, and the other of the two loops 621 fits around the second connecting rod 22 of the second retaining ring 20. The combination of the double retaining ring 100 and the energy-absorbing package 60 forms an energy-absorbing device 200 with a double retaining ring.

The two rivets 521 are pre-set to be the weakness for absorbing the impact force, and the width W1 of the opening 461 is greater than or equal to the diameter D1 of the shaft 50. In this way, referring to FIG. 4, FIG. 6, and FIG. 9, when the double retaining ring 100 is fixed to the back ring of the full-body safety harness and the energy-absorbing package 60 is engaged with the double retaining ring 100 and the second retaining ring 20 of the double retaining ring 100 is subjected to the impact force, the shaft 50 could be smoothly detached from the accommodating grooves 46 of the two receiving seats 40 through the openings 461 of the two receiving seats 40 after the two rivets 521 absorb the impact force to be broken, so that first retaining ring 10 of the double retaining ring 100 and the second retaining ring 20 of the double retaining ring 100 are separated. When the first retaining ring 10 and the second retaining ring 20 are separated and the second retaining ring 20 is forced to move in a direction away from first retaining ring 10, two ends of the energy-absorbing package 60 are pulled in opposite directions, so that the folded portion 64 of the energy-absorbing package 60 receives the impact force. Thereby, the double retaining ring 100 could generate a buffer effect, and the energy-absorbing package 60 which is engaged with the double retaining ring 100 could also absorb the impact force, and thus the buffer effect is enhanced. In other embodiments, the width W1 of the opening 461 could be less than the diameter D1 of the shaft 50, as long as the shaft 50 could smoothly spread the fixing arms 44 detach from the accommodating groove 46 of each of the receiving seats 40 when the two rivets 521 are broken.

In the aforementioned embodiment, the shaft seat 30 of the pivot device A is connected to the first connecting rod 12 of the first retaining ring 10, and the two receiving seats 40 are connected to second connecting rod 22 of the second retaining ring 20. In other embodiments, the two receiving seats 40 could be connected to the first connecting rod 12 of the first retaining ring 10, and the shaft seat 30 could be connected to the second connecting rod 22 of the second retaining ring 20, while the shaft 50 is engaged with the shaft seat 30 and the two receiving seats 40 in the same manner as in the aforementioned embodiment; in this way, the first retaining ring 10 could rotate relative to the second retaining ring 20 through the pivot device A. The first retaining ring 10 is fixed and the two rivets 521 could absorb the impact force and be broken to separate the first retaining ring 10 and the second retaining ring 20 when the second retaining ring 20 is subjected to the impact force. In addition, the structure of the first retaining ring 10 is not limited to the detachable D-ring and could be a closed ring; the structure of the second retaining ring 20 is not limited to the closed ring and could be a detachable D-ring.

It must be pointed out that the embodiments described above are only some preferred embodiments of the present invention. All equivalent structures which employ the concepts disclosed in this specification and the appended claims should fall within the scope of the present invention.

What is claimed is:

1. A double retaining ring, comprising:

a first retaining ring;

a second retaining ring; and a pivot device, comprising a shaft seat, two receiving seats, and a shaft, wherein the shaft seat is connected to either the first retaining ring or the second retaining ring and the two receiving seats are connected to the other of the first retaining ring and the second retaining ring; the shaft seat has an axial hole; each of the two receiving seats has two fixing arms, and an accommodating groove and an opening are formed between the two fixing arms; the opening is formed on one side of the accommodating groove; two rivet holes are respectively provided on two opposite sides of the shaft; the shaft passes through the axial hole and is inserted into the two accommodating grooves of the two receiving seats; two rivets respectively pass through the two rivet holes, wherein two ends of each of the two rivets are engaged with the two fixing arms of each of the two receiving seats.

2. The double retaining ring as claimed in claim 1, wherein the shaft seat comprises two ring bodies; the two ring bodies are disposed at an interval and the axial hole is formed on the two ring bodies; the two ring bodies are located between the two receiving seats.

3. The double retaining ring as claimed in claim 2, wherein a width of the opening is greater than or equal to a diameter of the shaft.

4. The double retaining ring as claimed in claim 2, wherein either the first retaining ring or the second retaining ring is a detachable D-ring.

5. The double retaining ring as claimed in claim 4, wherein the first retaining ring is a detachable D-ring and the second retaining ring is a closed ring; one side of the first retaining ring, which is close to the second retaining ring, has a first connecting rod, and the two ring bodies are connected to the first connecting rod; one side of the second retaining ring, which is close to the first retaining ring, has a second connecting rod, and the two receiving seats are connected to the second connecting rod.

6. The double retaining ring as claimed in claim 5, wherein two ends of the first connecting rod are respectively connected to a first side rod and a second side rod; a free end of the first side rod is connected to a first bolt seat, and the first bolt seat has a first perforation; a free end of the second side rod is connected to a second bolt seat, and the second bolt seat has a second perforation, and the second perforation and the first perforation face each other; a bolt is inserted into the first perforation and the second perforation and is detachably engaged with the first bolt seat and the second bolt seat.

7. The double retaining ring as claimed in claim 6, wherein the bolt has a bolt body and a head; a periphery of the bolt body is elastically engaged with a block; the head is connected to one end of the bolt body and has a button that drives the block to shrink into the bolt body when the button is pressed; the bolt body passes through the first perforation and the second perforation, the head abuts against one side of the second bolt seat away from the first bolt seat, and the block abuts against one side of the second bolt seat facing the first bolt seat.

8. The double retaining ring as claimed in claim 6, wherein the bolt has a bolt body and a head; a portion of the bolt body passing through the first perforation has a fixing slot; the head is connected to one end of the bolt body, and the other end of the bolt body forms a bevel; the head abuts against one surface of the second bolt seat away from the first bolt seat; a pin slot is provided in the first side rod and the first bolt seat; the pin slot communicates with the first perforation; a surface of the first side rod has an elongated hole, wherein an extending direction of the elongated hole is perpendicular to an axis of the bolt body, and the elongated hole communicates with a periphery the pin slot; a dowel pin and a spring are disposed in the pin slot; one end of the dowel pin has an inclined surface matching the bevel and is inserted into the fixing slot; the spring abuts against the other end of the dowel pin and an inner end of the pin slot; a push button is disposed on the first side rod; the push button passes through the elongated hole and is engaged with the dowel pin.

9. The double retaining ring as claimed in claim 5, wherein the other side of the second retaining ring, which is away from the first retaining ring, has a hanging rod; two ends of the hanging rod have two bulges, and a contour of a periphery of each of the two bulges is greater than a contour of a periphery of the hanging rod.

10. An energy-absorbing device with a double retaining ring, comprising:

a double retaining ring, comprising a first retaining ring, a second retaining ring, and a pivot device, wherein the pivot device comprises a shaft seat, two receiving seats, and a shaft; the shaft seat is connected to either the first retaining ring or the second retaining ring and the two receiving seats are connected to the other of the first retaining ring and the second retaining ring; the shaft seat has an axial hole; each of the two receiving seats has two fixing arms, and an accommodating groove and an opening are formed between the two fixing arms; the opening is formed on one side of the accommodating groove; two rivet holes are respectively provided on two opposite sides of the shaft; the shaft passes through the axial hole and is inserted into the two accommodating grooves of the two receiving seats; two rivets respectively pass through the two rivet holes, wherein two ends of each of the two rivets are engaged with the two fixing arms of each of the two receiving seats; and an energy-absorbing package comprising a strap body and a folded portion formed by folding a middle of the strap body, wherein two loops are respectively provided on two ends of the strap body; one of the two loops fits around the first retaining ring and the other of the two loops fits around the second retaining ring.

* * * * *